United States Patent [19]
Ritter

[11] Patent Number: 5,417,328
[45] Date of Patent: May 23, 1995

[54] CHIP CARD CASE WITH CHIP-COVERING WEB

[76] Inventor: Gerhard Ritter, Haller Strasse 21, 74019 Heilbronn, Germany

[21] Appl. No.: 212,017

[22] Filed: Mar. 11, 1994

[30] Foreign Application Priority Data

Dec. 1, 1993 [EP] European Pat. Off. ........... 93119328

[51] Int. Cl.⁶ .................... B65D 85/30; B65D 73/02
[52] U.S. Cl. .................... 206/449; 150/147; 206/328
[58] Field of Search ............ 206/449, 454, 328, 39.5, 206/39.6, 39; 150/147, 149; 40/490, 649

[56] References Cited

U.S. PATENT DOCUMENTS

| | | | |
|---|---|---|---|
| 1,288,395 | 12/1918 | Duncan | 40/649 X |
| 4,141,400 | 2/1979 | Mangan | 150/147 X |
| 4,450,955 | 5/1984 | Featherston | 150/147 X |

FOREIGN PATENT DOCUMENTS

| | | | |
|---|---|---|---|
| 0251900 | 1/1988 | European Pat. Off. | 150/147 |
| 9307959 | 9/1993 | Germany . | |
| 2238344 | 5/1991 | United Kingdom | 150/147 |

*Primary Examiner*—Bryon P. Gehman
*Attorney, Agent, or Firm*—Michael J. Striker

[57] ABSTRACT

A chip card case has a base part having opposite lateral longitudinal edges, two guide strips arranged at the longitudinal edges and together with the base part forming a reception space for a chip card, the base also having two ends spaced from one another in a longitudinal direction, one of the ends being provided with front insertion openings, another of the ends being provided with at least one card stop, and at least one web which connects the guide strips with one another and is located in an area when a chip is to be located when a chip card is inserted, the at least one web having a width selected so as to at least cover a chip face.

13 Claims, 4 Drawing Sheets

CHIP CARD CASE WITH CHIP-COVERING WEB

BACKGROUND OF THE INVENTION

The present invention relates to a chip card case.

More particularly, it relates to a chip card case which has a closed base part with two guide strips, a front insertion opening, and at least one card stop.

To an ever increasing extent integrated electronic components (chips) are incorporated into cards used for payment purposes at the present time, more particularly in connection with automatic cash dispensers, telephones, etc. These chip cards are particularly susceptible to the chips breaking out as a result of bending or pressing of the card when carried in the back pocket, purse or other personal container. In general, chip cards are also provided on the back with magnetic strips, which can easily become damaged if the chip card is unprotected during transportation. The edges of the cards, which are important when the said cards are used in automatic cash dispensers can also easily be damaged due to unprotected transportation of the chip card.

DE 93 007 959 U1 discloses a card case for chip cards, phone cards or similar thin-walled cards, which is manufactured as a one-piece plastic part and whose outer contour only projects over the inserted card in the vicinity of the longitudinal edges. This card case has an outer contour substantially corresponding to the chip card shape, is extremely thin and non-bulky, is rigid, so that the card is protected against bending, and leads to a good protection for the edges.

However, this known chip card case does not reliably prevent the breaking out of chips in the manner described hereinbefore and also does not have an optimum design with respect to the protection of the magnetic strip.

SUMMARY OF THE INVENTION

Accordingly, it is an object of the present invention to provide a a chip card case, which ensures an improved protection of the chip card against damage. The protection against damage to the chip card parts necessary for identification is in particular to be improved.

In keeping with these objects and with others which will become apparent hereinafter, one feature of the present invention resides, briefly stated, in a chip card case of the above mentioned general type in which the guide strips are connected by means of at least one web which is positioned in an area where the chip is located when the chip card is inserted and which has a width which at least covers the chip face.

When the chip card case is designed in accordance with the present invention, it provides for the above mentioned advantages.

The chip card case according to the invention has at least one web, which connects the guide strips located on opposite lateral longitudinal edges. The web is located in an area where the chip is positioned when the chip card is inserted. As in general the chip is located in one half of the chip card, the web is also located in the vicinity of the front edge of the chip card case. The web has a width which at least covers the chip face, but it is also possible to make the web width greater, so that for different chip cards with differently positioned chips an adequate area is covered. Such a web ensures a good durability of the chip and prevents the breaking out of and damage to the chip.

According to a preferred embodiment the web has a slight curvature, which improves handling and offers advantages in the case of manufacture by injection moulding. This also prevents a snapping in of the web when the chip card is drawn out. The distance between the web and the base part remains the sane when the card is extracted. In order to take account of a possible thickening of the chip card in the vicinity of the chip, according to another preferred embodiment the web can be made thicker in the marginal area, where the web is adjacent to the guide strip, than in the centre. In another advantageous development on the side facing the chip card there is a depression for receiving the chip, which is in particular necessary in the case of chip cards, which have a greater thickness in the vicinity of the chip.

The above measures ensure that the chip cannot break out during transportation as a result of bending or pressing of the card. However, this presupposes that the card has been inserted in the correct way into the chip card case. According to another preferred embodiment the chip card case has a second web, which can be constructed in accordance with the first web and is provided with the same spacing with respect to the corresponding front side of the chip card case. As a result of this construction it is unimportant how the chip card is inserted into the chip card case. Therefore the chip is also protected when the chip card is turned round. There is necessarily a free space between the two webs and this is inter alia available to the user for sliding out the card.

For the protection of the magnetic strip which, as stated hereinbefore,. will conventionally still be used in chip cards at least for a transitional time, the base part has at least one depression running in the longitudinal direction of the case and which is positioned in the area in which the magnetic strip is located when the chip card is inserted. Therefore the magnetic strip is not on the base part, so that it is not possible for the magnetic strip to be damaged on inserting into the chip card case as a result of the latter and by dirt in said case. Preferably the base part has two depressions, so that it is unimportant which front edge of the chip card is inserted first into the chip card case.

According to another advantageous development a further depression is provided between the two aforementioned depressions and which can be shallower and narrower than said two outer depressions. This additional depression is provided in order to give a space into which can e.g. pass inscriptions raised from the chip card or the signature strip when the card is inserted in the chip card case. The cross-section of the surface of the base part can be substantially sinusoidal and in the vicinity of the maximum between two troughs, there is a shallow trough. However, it is also possible to have any other trough or valley shape suitable for fulfilling the aforementioned functions.

In an appropriate embodiment, the surface of the base part is provided in the vicinity of the insertion opening with at least one cleaning face for magnetic strips. Appropriately two cleaning faces are provided, so that here again there is no need to respect any particular insertion direction for the chip card. The cleaning faces essentially correspond to the magnetic strip width and, as a function of manufacture, can be in the form of differently constructed, toughened faces on which the magnetic strip engages on insertion into the chip card case, so that any dirt on the magnetic strip is removed.

According to a preferred embodiment the cleaning face has longitudinally directed webs. The upper edge of the webs can be raised with respect to the remainder of the base part in the vicinity of the insertion opening, or can correspond thereto. In the latter case the base part is made thinner between the webs.

According to another preferred embodiment the chip card case is manufactured as a one-piece plastic injection moulding, which leads to optimum durability and inexpensive manufacture. The chip card case is made from a material, e.g. acrylic glass (PMMA), which can be reused and contains no plasticizer. The chip card case is extremely flat and slightly elastic, but still has a long-term stiffness.

The chip card case constructed in accordance with the invention is therefore able to meet all the demands which occur in connection with the protection of the most important parts of a chip card. As a result of its size, which substantially corresponds to the chip card, it can also be easily handled by the user.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
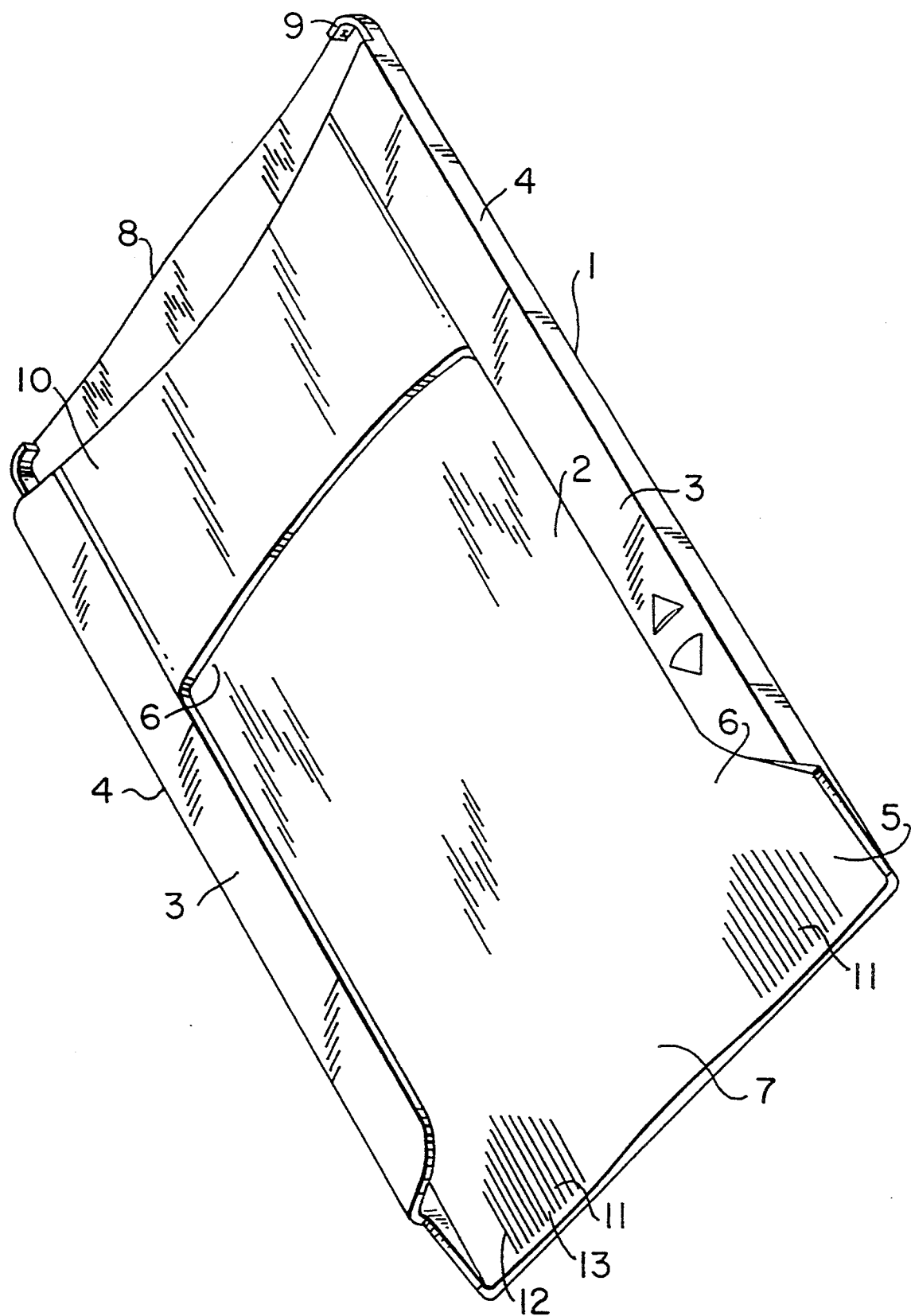
FIG. 1 A perspective view of a chip card case with a web.

FIG. 1 shows a chip card case 1 with a base part 2, which at the lateral longitudinal edges passes into two guide strips 3, which together with the surface 5 of the base part 2 form the card reception space 6. On the side 8 opposite to the front insertion opening 7 there are card stops 9, which prevent a sliding out of the chip card case 1. The chip card case 1 shown in FIG. 1 has a web 10, which is located in the vicinity of the front face 8 and has a width which substantially corresponds to the greatest extension of a not shown chip and is slightly curved outwardly or away from the base part 2. In the vicinity of the insertion opening 7 there are two cleaning faces 11, with the webs 12 and depressions 13 between the latter.

Figure 2A:
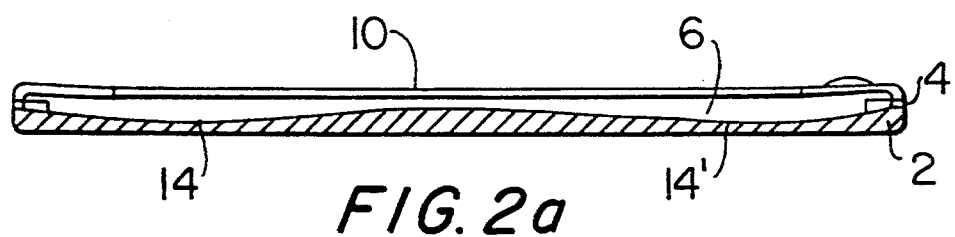
FIG. 2a and 2b are a front view of the chip card case of FIG. 1 and a front view of a chip card case according to another embodiment.
Figure 2B:
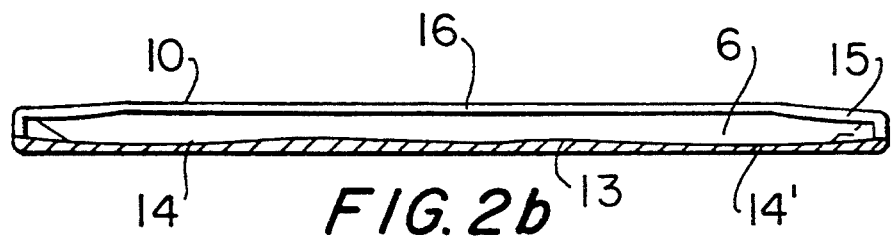

As can be gathered from FIG. 2a, the base part 2 has a sinusoidal cross-section with two wave troughs 14, 14′, which house the magnetic strip when the not shown chip card is inserted. In the embodiment shown in FIG. 2b the web 10 is thicker in the marginal area 15 than in the central area 16, so as to take account of an increase in the chip card height as a result of the chip. FIG. 2b shows an alternative wave shape for the surface 5 of the base part 2. A further trough 13 is positioned between the two troughs 14 and 14′. The trough 13 is more shallow in the centre and is used for receiving the signature strip or protuberances located on the card.

Figure 3:
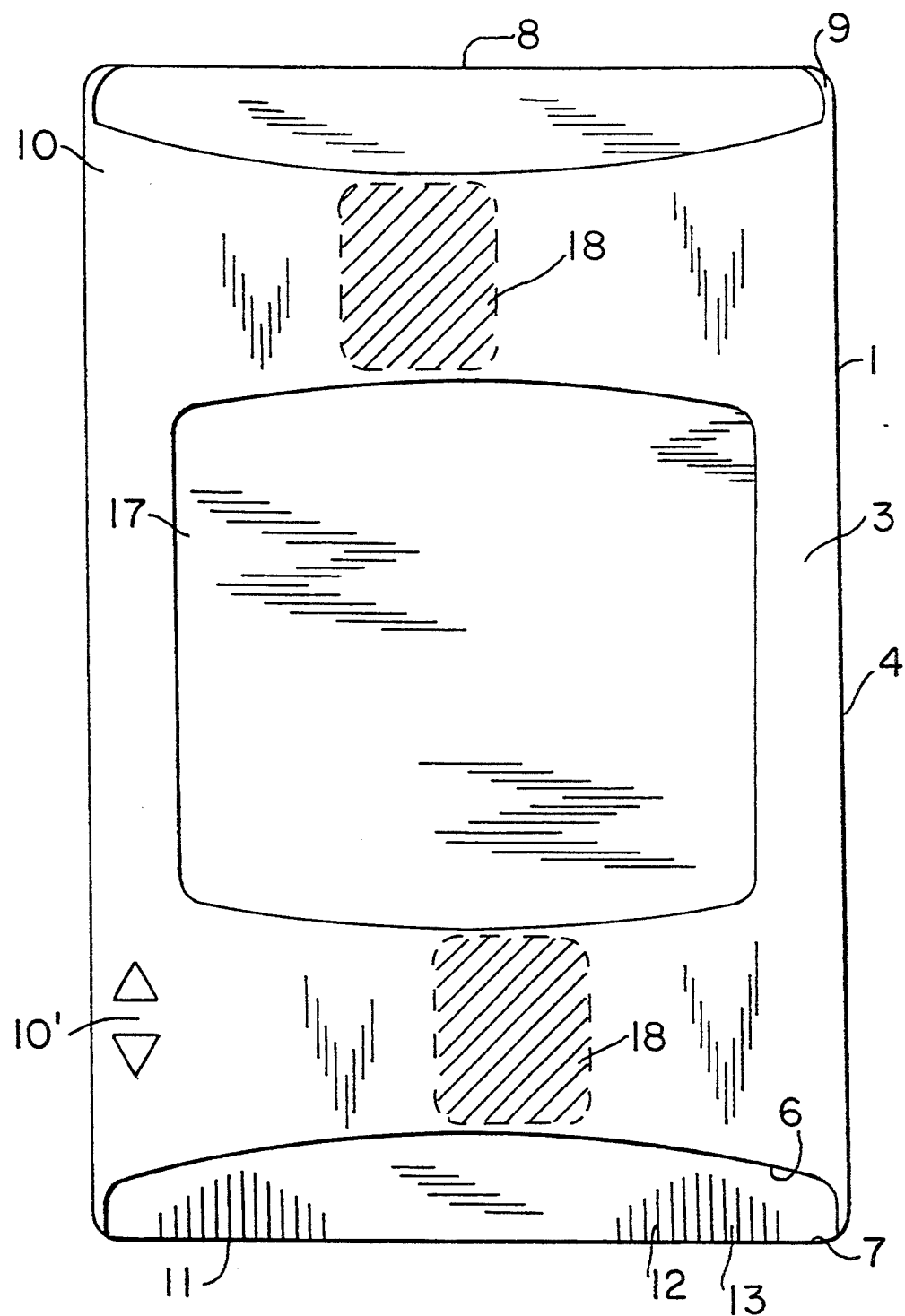
FIG. 3 A plan view of a chip card case with two webs.

FIG. 3 shows another chip card case 1 with two webs 10, 10′, which are located at an equal distance from the two front faces 7, 8. The area 17 between the two webs 10, 10′ remains accessible to the user, e.g. for sliding out the card. The two webs 10, 10′ have in each case a reception area 18 for the chip. They can e.g. be designed as depressions on the bottom of the webs. In the case of chip cards, which in the chip area have a protuberance, the latter then passes into the reception area 18. As a result of the arrangement of two webs with the corresponding reception areas, the chip still has an optimum protection even when turned round.

Figure 4B:
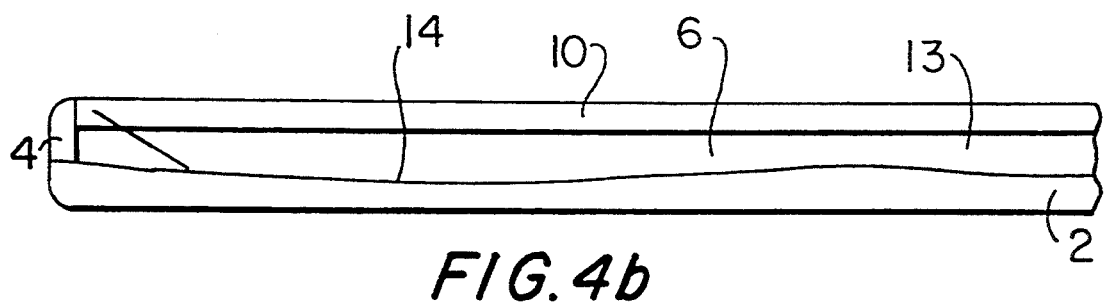
FIG. 4a and 4b are a front view of the chip card case according to FIG. 3 and a larger-scale detail X.
Figure 4A:
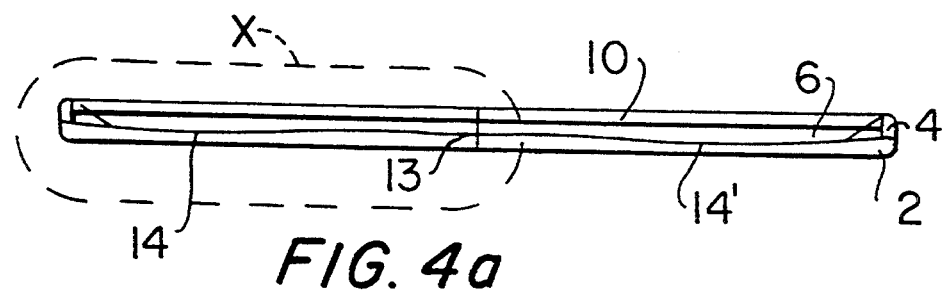

The front view 4a shown in FIG. 4, together with the detail X in FIG. 4b once again illustrates the configuration of the surface 5 of the base part 2 with the troughs 13, 14 and 14′.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A chip card case, comprising an elongated base part having opposite lateral longitudinal edges; two guide strips arranged at said longitudinal edges and together with said base part forming a reception space for a chip card, said base part also having two ends spaced from one another in a longitudinal direction, one of said ends being provided with a front insertion opening, the other of said ends being provided with at least one card stop; and at least one web which connects said guide strips with one another and is located at said other end in an area where a chip is to be located when a chip card is inserted, said at least one web having a width selected so as to at least cover a chip face.

2. A chip card case as defined in claim 1, wherein said at least one web has an area adjacent to said guide strips and a central area, said at least one web being thicker in said area adjacent to said guide strips than in said central area.

3. A chip card case as defined in claim 1, wherein said at least one web has a side adapted to face a chip card and is provided at said side with a depression for receiving the chip.

4. A chip card case as defined in claim 1, wherein said at least web is curved outwardly away from said base part.

5. A chip card case as defined in claim 1; and further comprising a second at least one web connecting said guide strips with one another, said webs being spaced from one another in the longitudinal direction of said base part and being equidistantly spaced from said ends of said base part.

6. A chip card case as defined in claim 1, wherein said base part has at least one depression extending in the longitudinal direction of said base part and located in an area in which a magnetic strip is to be located when a chip card is inserted.

7. A chip card case as defined in claim 6, wherein said base part has a second depression, said depressions being spaced from one another in a transverse direction which is transverse to said longitudinal direction.

8. A chip card case as defined in claim 7, wherein said base part has a further depression located between said first mentioned depressions and provided for protuberances on the chip card.

9. A chip card case as defined in claim 1, wherein said base part has a surface; and further comprising at least one cleaning face provided for cleaning magnetic strips and located on said surface of said base part in the vicinity of said insertion opening.

10. A chip card case as defined in claim 9, wherein such said cleaning face includes a plurality of longitudinal webs with depressions between said longitudinal webs.

11. A chip card case as defined in claim 1, wherein said base part, said guide strips and said at least one web together form a one-piece member.

12. A chip card case, comprising an elongated base part having opposite lateral longitudinal edges; two guide strips arranged at said longitudinal edges and together with said base part forming a reception space for a chip card, said base part also having two ends spaced from one another in a longitudinal direction, one of said ends being provided with a front insertion opening while the other of said ends is provided with at least one card stop; two webs connecting said guide strips with one another and including one web located at said one end and another web located at said other end in an area where a chip is to be located when a chip card is inserted, said webs having a width selected so as to at least cover a chip face and being spaced from one another in the longitudinal direction of said base part.

13. A chip card case as defined in claim 12, wherein said webs are curved outwardly away from said base part.

* * * * *